(No Model.)
C. T. LEONARD.
PIPE COUPLING.
No. 428,846.        Patented May 27, 1890.
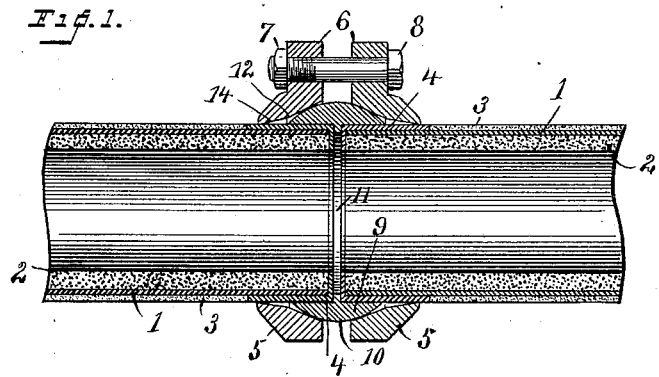
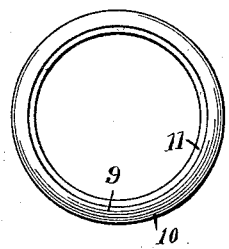 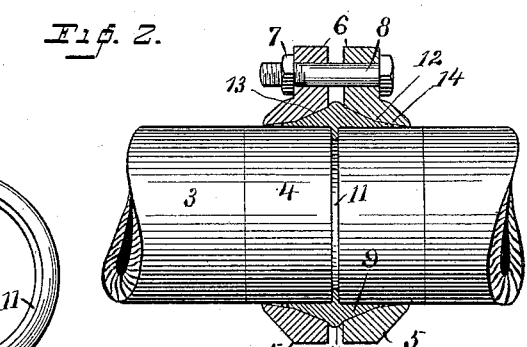
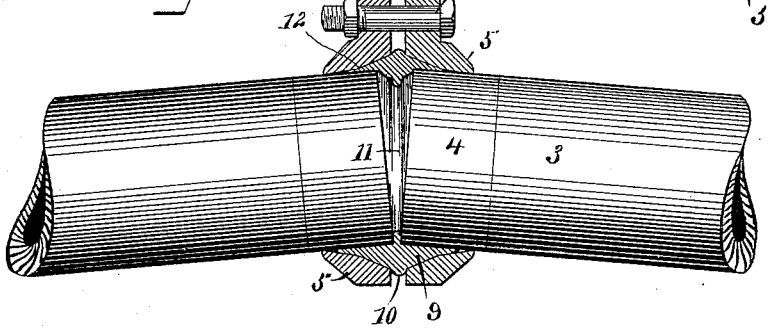
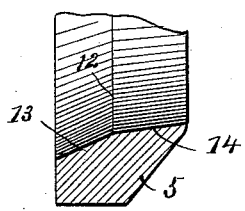
WITNESSES
C. M. Newman,
Riley P. Munson.
INVENTOR
Charles T. Leonard
By A. M. Wooster
Atty.

UNITED STATES PATENT OFFICE.

CHARLES T. LEONARD, OF NORWALK, CONNECTICUT.

PIPE-COUPLING.

SPECIFICATION forming part of Letters Patent No. 428,846, dated May 27, 1890.

Application filed April 15, 1890. Serial No. 347,962. (No model.)

*To all whom it may concern:*

Be it known that I, CHARLES T. LEONARD, a citizen of the United States, residing at Norwalk, in the county of Fairfield and State of Connecticut, have invented certain new and useful Improvements in Pipe-Couplings; and I do hereby declare the following to be a full, clear, and exact description of the invention, such as will enable others skilled in the art to which it appertains to make and use the same.

My invention has for its object the production of a pipe-coupling which shall consist of the fewest possible number of parts, both internal and external sleeves being dispensed with, likewise all threading of parts, in which the parts shall be so constructed that it shall be impossible for any of them to slip out of place when tightening up in making turns, in which the cost of production shall be reduced to the minimum, and which shall be so constructed that while perfectly adapted to ordinary iron pipe it shall be especially adapted to the lighter grades of pipes which are liable to be crushed by the various couplings now in use. In order to produce this coupling, which I have found in practice to be admirably adapted to the joining of cement pipe, and to make perfectly safe and water-tight joints upon turns, I have found it necessary, as the result of experiments running through many months, to modify the details of construction of couplings long in common use. These modifications, however, I have found, as the result of my experiments, to be absolutely essential in order to accomplish the desired result.

In the accompanying drawings, forming part of this specification, Figure 1 is a section of the ends of two lengths of pipe and the coupling connecting them, the parts of the coupling being fixed in place, but not tightened up; Fig. 2, a section of a coupling, the ends of the lengths of pipe being in elevation and the parts of the coupling drawn together, as in making a joint in use; Fig. 3, a similar view showing the manner in which the parts of my novel coupling operate in joining two lengths of pipe at an angle to each other, as in making turns; Fig. 4, an enlarged detail view showing the shoulder on the interior of the coupling-rings, also the two surfaces at an obtuse angle to each other; Fig. 5, a plan view of a packing-ring detached; and Fig. 6 is a plan view of one of the coupling-rings detached.

I have illustrated my invention as used in connection with a special style of pipe which is now going into use extensively, but which I have found it impossible to connect satisfactorily, especially in making turns, with any of the couplings now known to the trade, the most serious difficulties being that in some instances the packing-rings would slip, and thus fail to make a tight joint, and in other instances, even in laying a straight line of pipe, in order to get a tight joint it was necessary to draw the coupling-rings together and compress the packing-ring with such force as to crush the ends of the pipes themselves. The pipe to which I refer is a light iron pipe lined with cement and coated externally with asphaltum. The pipe is very durable, not affected in the slightest by moisture, strong to resist internal pressure, and very much cheaper than other high-grade pipes. As already stated, however, the difficulty has been to couple the lengths so as to make tight joints and not damage the pipe.

1 denotes the light iron pipe; 2, the cement lining, and 3 the covering of asphaltum. At the ends of the lengths of pipe I ordinarily place flanged metallic sleeves 4. These may or may not be used and are not essential when my present coupling is used.

The coupling consists of two rings denoted by 5, having the usual flanges 6 to adapt each pair of rings to be drawn together by nuts 7 upon bolts 8, and a packing-ring denoted by 9, this ring being ordinarily made of lead, although any soft alloy may be used, if preferred. The novel changes which I have made in the details of construction are that the exterior of the packing-ring is curved from edge to edge, being made thickest in the center, as at 10, from which point it tapers in both directions to the edges, the inner side of the ring being of the same diameter from end to end, as indicated in Fig. 1 in connection with Fig. 5, except that at the center I provide an inwardly-extending flange 11, which in use lies between the ends of the lengths of pipe, as shown in Figs 1, 2, and 3. I use in connection with my peculiar style of packing-ring coupling-rings, the inner faces of which form the sides of an obtuse angle, the shoulder or projection at the apex of the angle being at about the center, as indicated at 12, the inner and outer faces—that is, the surfaces on opposite sides of the shoulder—being indicated, respectively, by 13 and 14. I find in practice that the action of these shoulders or projections upon the coupling-rings, in connection with my special form of packing-ring, is to displace the soft metal of the packing-ring laterally in both directions, as well as to press the entire inner surface of the ring firmly in against the exterior of the ends of the pipe. The compressive power inward, however, is never sufficient to crush the pipe.

My novel construction insures perfectly-tight joints by compression of the packing-ring, no matter whether the two ends of pipe lie straight or at an angle; but accomplishes this result by displacing the metal of the packing-ring both inward and outward in the direction of the length of the pipe, instead of compressing it entirely inward toward the center.

Having thus described my invention, I claim—

The combination, with two ends of pipe, of a packing-ring adapted to receive the ends of pipe, and having an inwardly-extending flange adapted to lie between said ends, the outer surface of said packing-ring being curved from edge to edge and having its greatest thickness at the center and tapering in both directions to the edges, and coupling-rings having flanges to receive bolts in the usual manner, said rings having upon their inner faces shoulders 12, and surfaces 13 and 14 on opposite sides of said shoulders, whereby when the coupling-rings are tightened up the metal of the packing-ring is displaced laterally in both directions, as well as pressed inward toward the center, substantially as described.

In testimony whereof I affix my signature in presence of two witnesses.

CHARLES T. LEONARD.

Witnesses:
A. M. WOOSTER,
ARLEY I. MUNSON.